United States Patent [19]

Pfarr, Jr.

[11] 4,132,390
[45] Jan. 2, 1979

[54] GATE AND PANEL SYSTEM

[75] Inventor: Walter L. Pfarr, Jr., Towson, Md.

[73] Assignee: Anchor Post Products, Inc., Baltimore, Md.

[21] Appl. No.: 798,775

[22] Filed: Jul. 15, 1977

[51] Int. Cl.² ............................................ E04H 17/14
[52] U.S. Cl. ........................................ 256/24; 256/73; 160/392
[58] Field of Search ................... 256/32, 33, 47, 24, 256/73; 160/392, 398, 395, 403

[56] References Cited

U.S. PATENT DOCUMENTS

| | | | |
|---|---|---|---|
| 2,335,361 | 11/1943 | Schiller | 160/395 |
| 2,826,394 | 3/1958 | Pinson | 256/32 |
| 2,835,325 | 5/1958 | Gilbert et al. | 160/395 X |
| 3,410,527 | 11/1968 | Uroshevich | 256/32 |
| 3,997,144 | 12/1976 | Parisien | 256/32 |

Primary Examiner—Andrew V. Kundrat
Attorney, Agent, or Firm—Walter G. Finch

[57] ABSTRACT

The invention is an improved method and apparatus for making a gate or fence panel assembly for a fenced enclosure. In particular, the invention provides a novel and unique method and apparatus for holding chain link fabric in a gate or fence panel. The frame of the gate or panel is provided with a plurality of teeth-like ridges in the interior sides of the special channel-like members of the frame, into which special clips or retainers mesh by press-fit and hold the chain link fabric in place. The said clips or retainers being capable of providing tension on the chain link fabric to keep it taut. Special interior corner connectors are provided in the invention to secure the frame in a rectangular or other geometrical shape or configuration, with special designed cover clips for the mitred joint at the corners of the gate.

10 Claims, 11 Drawing Figures

GATE AND PANEL SYSTEM

BACKGROUND AND SUMMARY OF THE INVENTION

The invention relates to gates and panels used in any fenced enclosure, but is particularly related to gates and panels in a matching chain link type fence.

A need has existed for a fabricated gate or panel which can be easily assembled in the field from piece parts shipped knocked-down in a carton, or as bulk loose parts. This invention answers that need.

In the past, gates had to be assembled in a shop and shipped ready for installation. This method required costly handling and shipping that involved heavy duty transportation facilities for the large size gates, extra manpower at loading and unloading points, and often required mechanical equipment for the handling process. If assembling was attempted in the field it required powered equipment for rivetting or other assembling processes. This invention eliminates such expensive and laborious requirements.

This invention provides for the shipment of the gate or panel in a knock-down condition. The framework is merely longitudinal pieces; the fabric can be precut and shipped flat or rolled (depending on size), or can be cut to fit in the field from a bulk supply roll of the fabric, and the balance of parts can be shipped in a shipping carton or shipping bag. All of these individual elements of the gate structure are easily handled with a minimum of labor involved.

The assembly in the field can be accomplished with hand tools. The channel-like ridges are on the interior sides of the open face or throat of the channel-like frame. These teeth-like ridges are sloped or canted toward the interior of the channel and run with the longitudinal length of the channel-like frame member. Clips for holding the chain link fabric (which provides the barrier surface of the gate or panel), also have teeth-like ridges on the two opposite sides. These teeth-like ridges of the clips are easily pressed into place in the channel, after being hooked to the chain-like fabric. The teeth-like ridges of the clips (which are sloped or canted in an opposing direction from the teeth-like ridges in the aforementioned channel-like frame) mesh with the teeth-like ridges of the channel-like frame and lock into place as the said clips are pushed into place in the channel-like frame.

The tension of the chain link fabric holds the teeth in the locked condition. The plurality of teeth allow for various amounts of tensioning and adjustment.

Several embodiments of the aforementioned clip will be described in the specifications which follow.

A corner connector fits into the tube portion of the channel-like frame members that meet at each of the corners of gate frame, thus simplifying the assembly without the need for rivets, bolts, or screws. A cover molding can be used to cover the mitred joint of the gate.

It is therefore an object of the invention to provide an easily assembled gate for a fenced enclosure.

It is another object of the invention to provide a gate that can be shipped in knocked-down condition for easy assembly in the field with simple hand tools.

It is still another object of the invention to provide a means for holding chain-link fabric suspended within a gate frame or panel that can be pushed into assembled position.

It is a further object of the invention to facilitate the application of tension on chain link fabric suspended within a gate frame or fence panel so as to make it taut, by using the aforesaid means for holding the chain-link fabric suspended in the frame.

It is yet another object of the invention to provide a simple means for assembly of the gate frame members at the corners of the said gate.

Further objects and advantages of the invention will become more apparent in light of the following description of the preferred embodiments.

DESCRIPTION OF THE PREFERRED EMBODIMENTS OF THE INVENTION

Figure 1:
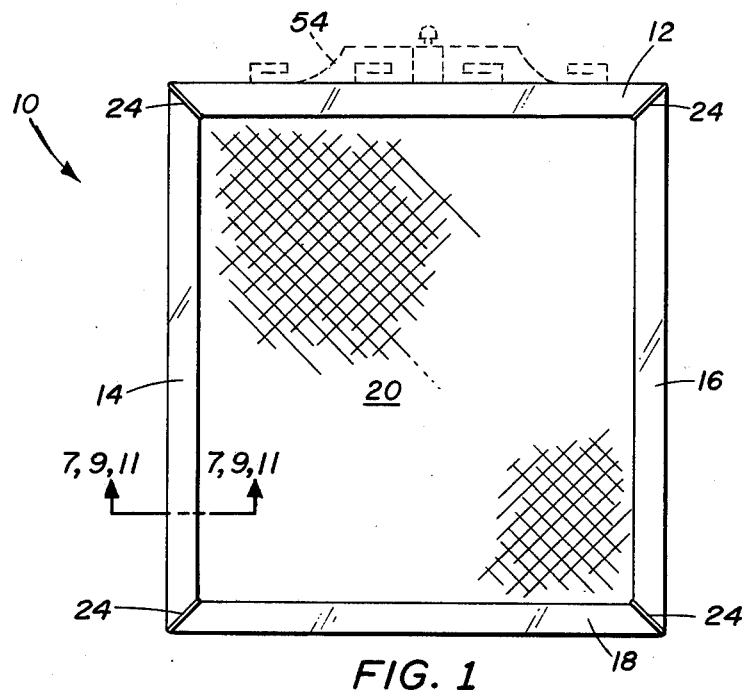
FIG. 1 is a front elevation of a preferred embodiment of a complete panel assembly incorporating features of this invention, with gate assembly decoration shown.
Figure 2:
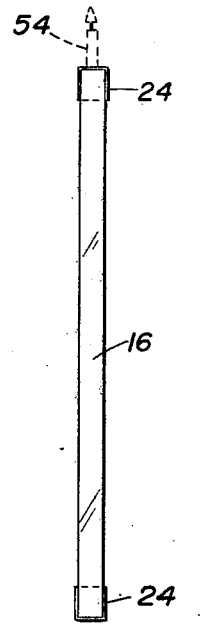
FIG. 2 is a side elevation of the gate assembly of FIG. 1.

Referring now to FIGS. 1 and 2 of the drawings, there is shown a gate assembly 10 (except for the mounting hinges and latching mechanism for the gate assembly which are not shown), for use in a chain link type fence. This gate assembly would normally be mounted between two vertical posts, with spaced hinges being mounted to one of the posts and the latching mechanism mounted to the gate assembly 10 for engagement with the other spaced post. Assembly 10 also represents a panel.

The framework of the gate assembly 10, which can be formed of metal, such as extruded aluminum, consists of two spaced vertical side frame members 14 and 16, and two spaced horizontal frame members 12 and 18 whose ends are cut at a 45° angle for engagement of the ends of the frame members 12, 14, 16, and 18 thereof when the framework is assembled to form the gate assembly 10. Said framework can also be formed of plastics, such as reinforced fibreglass.

As shown best in FIGS. 7, 9, and 11, each frame member 14 (the same for frame members 12, 16, and 18) is formed of an enclosed rectangular shape hollow tube having an opening 26 extending all of the way therethrough and a pair of extending sides or extensions 29 and 31, as will be described subsequently.

A right-angle corner fitting 22 is used to hold the respective ends of the frame members 12, 14, 16, and 18 in a locked position. This rectangle fitting 22 engaged in the rectangular opening 26 formed in each frame members 14 and 16, and a similar opening 28 in frame members 12 and 18. At the interface of the right-angle corner fittings 22 with the interiors of the respective ends of the frame members 12, 14, 16, and 18, an adhesive material may be used to hold the said parts in permanent contact with each other (rivets, bolts, or welding may be used).

A molding 24 may be utilized to cover the joints where the angular ends of frame members 12 and 14, 14 and 18, 18, and 16, and 16 and 12 mate so as to give better appearance to the framework of the gate assembly.

Each frame member 14 and 16 and 12 and 18, in addition to having a hollow tube with openings 26 and 28, respectively, has parallel spaced sides or extensions 29 and 31 extending outward from the main body of each frame member 12, 14, 16, and 18. Each of these sides or extensions 29 and 31 is formed internally with a plurality of angularly extending spaced teeth 40 with teeth ridges 34 positioned therebetween, as best shown in FIGS. 3, 4, 7, 9, and 11. These teeth 40 are inclined or angled inwardly to the main axis of the respective frame member 12, 14, 16, and 18.

Figures 7, 9, 11:
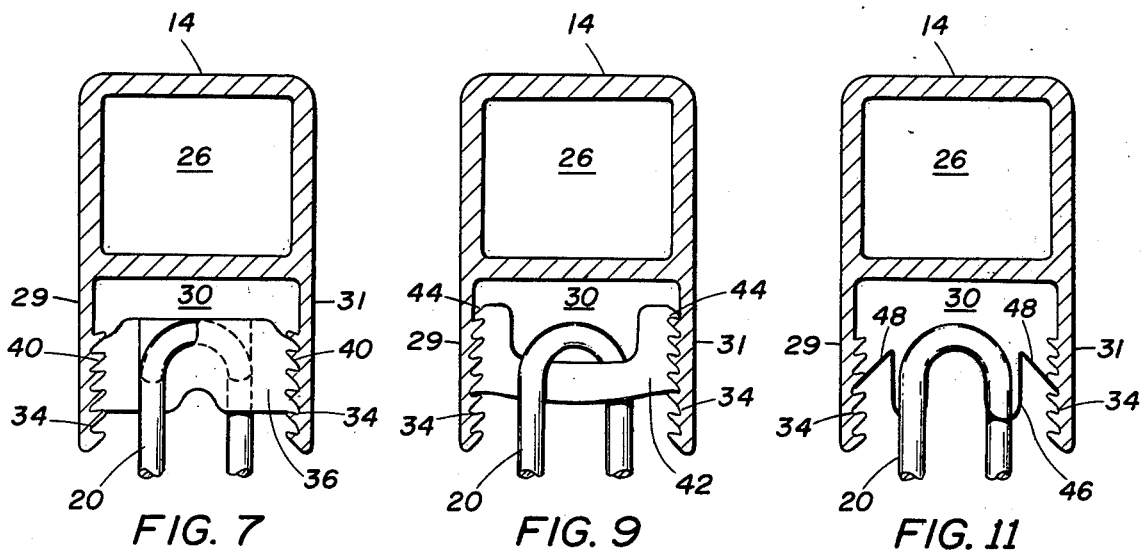
FIG. 7 is a cross section taken along line 7—7 of FIG. 1 showing the fabric clip of FIG. 6 installed in the gate assembly.
FIG. 9 is a cross section taken along line 9—9 of FIG. 1 showing the fabric clip of FIG. 8 installed on the gate assembly.
FIG. 11 is a cross section taken along line 11—11 of FIG. 1 showing the fabric clip of FIG. 10 installed in the gate assembly.
Figure 6:
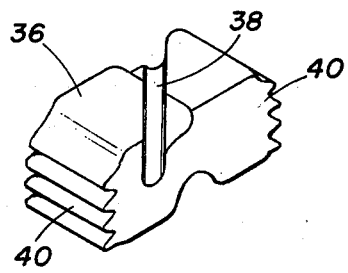
FIG. 6 is a perspective view of one embodiment of a fabric clip to fasten to extruded strip.
Figure 8:
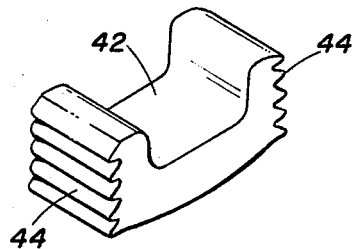
FIG. 8 is a perspective of a second embodiment of a fabric clip to fasten to extruded strip.
Figure 10:
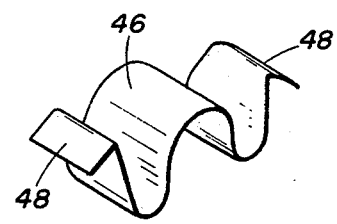
FIG. 10 is a perspective view of a third embodiment of a fabric clip to fasten to extruded strip.
Figure 4:
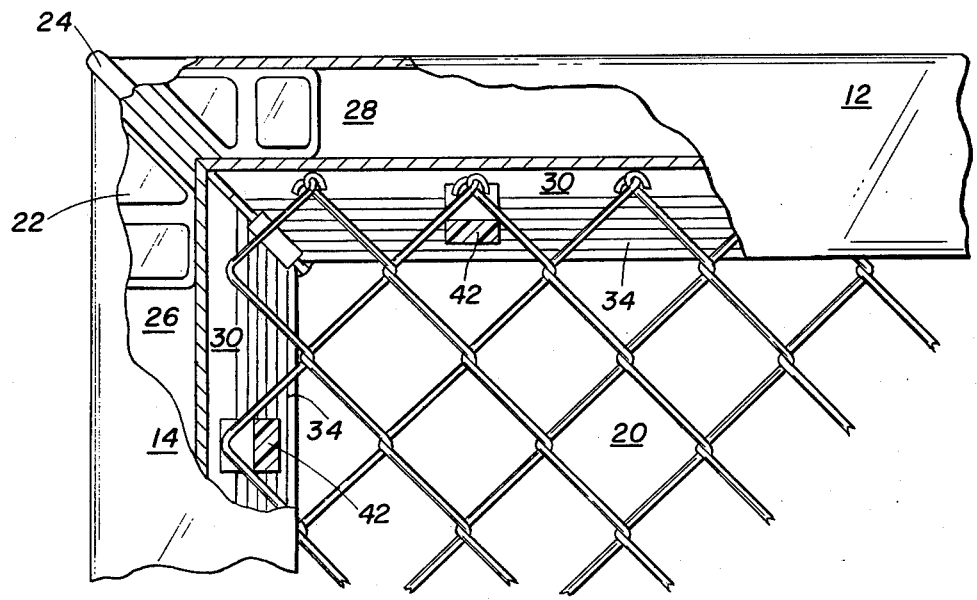
FIG. 4 is a partial cross section view of the upper left hand corner of the gate assembly showing the left hand corner of the gate assembly assembled.
Figure 5:
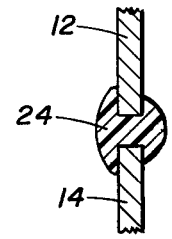
FIG. 5 is a cross section taken along line 5—5 of FIG. 3.
Figure 3:
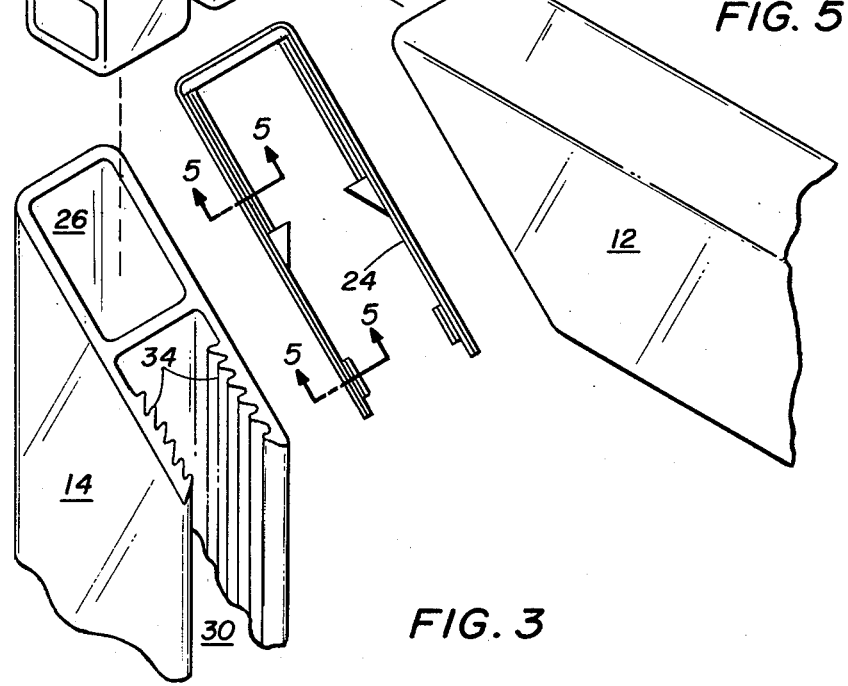
FIG. 3 is an exploded view of one corner of the gate assembly of FIG. 1 illustrating the method of assembling the corners thereof.

A plurality of spaced fabric clips 36, 42, or 46, as shown in FIGS. 6, 8, and 10, and in operative position in FIGS. 7, 9, and 11, respectively are utilized for holding the chain link fabric 20 in a taut condition in the framework of the gate assembly 10.

Fabric clip 36 shown in FIG. 6 has a recess 38 formed therein to receive the fabric loop of the fabric 20. In addition, the fabric clip 36 has a plurality of spaced teeth 40 formed and shaped to correspond to the teeth 40 of frame member 12. These teeth 40 of fabric clip 36 engage in the teeth ridges 34 between the teeth 40 of frame members 12, 14, 16 and 18, as best shown in FIG. 7 with the fabric loop being positioned as shown in the opening 30 of the frame member 12, 14, 16, and 18.

Fabric clip 42 as shown in FIG. 8 likewise is formed with spaced teeth 44 to engage in teeth ridges 34 formed between the teeth 40 of frame members 12, 14, 16, and 18 as best shown in FIG. 9, with the fabric loop being positioned as shown in the opening 30 of the frame members 12, 14, 16, and 18.

The fabric clips 36 and 42, are formed of rigid poly vinyl chloride plastics material, other rigid plastics or metal.

The fabric clip 46 of FIG. 10 is shaped as shown, with two extending lips 48. This fabric clip 46 is formed of stainless steel or other corrosive resistant metal. It is shown positioned in the frame member 12, or 14, 16, and 18 in FIG. 11, with the lips 48 thereof shown in engagement with the teeth ridges 34 positioned between the teeth 40 and the fabric loop of the chain link fabric 20 in operative position. The clip 46 may also be made of wire and bent to the same configuration.

In operation, the desired clips 36, 42, or 46 are used to assemble the chain link fabric 20 in taut condition to complete the gate assembly 10. The top of the panel assembly 10 can be formed with ornamentation 54, as shown outlined in dash lines in FIGS. 1 and 2, when used as a gate assembly.

Although this invention has been described for chain link fabric as part of the gate assembly, it is equally usable for any type of fabric used in a gate assembly that must be held taut in the framework.

The general description has primarily related the assembly to a gate, but it is to be understood that a panel is within the scope and intent of this invention and it is useable for either such assembly.

As can be readily understood from the aforegoing description of the invention, the present structure can be configured in different modes to provide the ability for various arrangements of the gate or panel assembly. Such configuring in different modes that utilized the novel and unique concepts of this invention are within the scope and intent of this invention.

What is claimed is:

1. A panel structure for use with fences, comprising, a framework of substantially rectangular configuration, said framework having two spaced side frame members and two spaced top and bottom frame members coupled together at their respective ends and all lying in a common plane, each said frame member having two substantially parallel spaced extensions extending inwardly and longitudinally thereof, a plurality of grip elements formed on the inner surfaces of said extensions, and spaced clip means having a corresponding plurality of grip elements formed in the surface thereof for engagement between the respective grip elements of said parallel spaced extensions, material means having spaced edge members positioned in said plane of said framework, said spaced edge members engaging and being held by the respective spaced clip means for holding said material means in a taut position in the plane of said framework of said panel.

2. A panel structure for use with chain link fences, comprising, a framework of substantially rectangular configuration, said framework having two spaced side frame members and two spaced top and bottom frame members coupled together at their respective ends and all lying in a common plane, each said frame member having two substantially parallel spaced extensions extending inwardly and longitudinally thereof, a plurality of teeth formed on the inner surfaces of said extensions, and spaced clip means having a corresponding plurality of teeth formed in the surface thereof for engagement between the respective teeth of said parallel spaced extensions, and fabric means having spaced edge elements positioned in said plane of said framework, said spaced edge elements engaging and being held by the respective spaced clip means for holding said chain link fabric in a taut position in said plane of said framework of said panel.

3. The panel structure as recited in claim 2, wherein the frame members each have a passageway extending longitudinally therethrough, and means insertable in the passageways of said frames for rigidly coupling the ends of said frame members together.

4. The panel structure as recited in claim 2, wherein the teeth of said extensions inclined inwardly with respect to said extensions.

5. The panel structure as recited in claim 4, wherein said clip means are formed of plastics material.

6. The panel structure as recited in claim 4, wherein said clip means are formed of stainless steel and said plurality of teeth thereon is limited to two said teeth, one tooth being on each side of said clip means.

7. The panel structure as recited in claim 1, and additionally having hinge means, and a latching means to form a gate.

8. The panel structure as recited in claim 2, and additionally having hinge means, and a latching means to form a gate.

9. A panel structure for use with fences, comprising, a framework configuration of at least four sides, said framework having at least two spaced side frame members and at least two spaced top and bottom frame members coupled together at their respective ends and all lying in a common plane, each said frame member having two substantially parallel spaced extensions extending inwardly and longitudinally thereof, a plurality of grip elements formed on the inner surfaces of said extensions, and spaced clip means having a corresponding plurality of grip elements formed in the surface thereof for engagement between the respective grip elements of said parallel spaced extensions, material means having spaced edge members positioned in said plane of said framework, said spaced edge members engaging and being held by the respective spaced clip means for holding said material means in a taut position in the plane of said framework of said panel.

10. A panel structure for use with chain link fences, comprising, a framework configuration of at least four sides, said framework having at least two spaced side frame members and at least two spaced top and bottom frame members coupled together at their respective ends and all lying in a common plane, each said frame member having two substantially parallel spaced extensions extending inwardly and longitudinally thereof, a plurality of teeth formed on the inner surfaces of said extensions, and spaced clip means having a corresponding plurality of teeth formed in the surface thereof for engagement between the respective teeth of said parallel spaced extensions, and chain link fabric means having spaced edge elements positioned in said plane of said framework, said spaced edge elements engaging and being held by the respective spaced clip means for holding said chain link fabric in a taut position in said plane of said framework of said panel.

* * * * *